United States Patent [19]

Governale et al.

[11] B 4,128,582

[45] Dec. 5, 1978

[54] CHEMICAL PROCESS

[75] Inventors: Luke J. Governale, Baton Rouge, La.; John C. Wollensak, Bloomfield Hills, Mich.

[73] Assignee: Ethyl Corporation, Richmond, Va.

[21] Appl. No.: 449,837

[22] Filed: Mar. 11, 1974

[44] Published under the second Trial Voluntary Protest Program on Mar. 2, 1976 as document No. B 449,837.

Related U.S. Application Data

[63] Continuation-in-part of Ser. No. 365,996, Jun. 4, 1973, abandoned.

[51] Int. Cl.$^2$ .............................................. C07C 87/28
[52] U.S. Cl. ................................... 260/578; 260/576; 260/577
[58] Field of Search ........................................ 260/578

[56] References Cited

U.S. PATENT DOCUMENTS

| | | | |
|---|---|---|---|
| 2,814,646 | 11/1957 | Kolka et al. | 260/578 X |
| 3,222,401 | 12/1965 | Schmerling | 260/578 |
| 3,230,257 | 1/1966 | Schmerling | 260/578 X |
| 3,275,690 | 9/1966 | Stroh et al. | 260/578 X |
| 3,649,693 | 3/1972 | Napolitano | 260/578 |
| 3,654,331 | 4/1972 | Klopfer | 260/578 X |
| 3,733,365 | 5/1973 | Yeakey et al. | 260/578 X |

FOREIGN PATENT DOCUMENTS

| | | | |
|---|---|---|---|
| 287,601 | 1/1914 | Fed. Rep. of Germany | 260/578 UX |
| 823,223 | 11/1959 | United Kingdom | 260/578 UX |

OTHER PUBLICATIONS

Olah, "Friedel-Crafts and Related Reactions," Vol. 1, p. 315, 1963.
"Organic Reactions," Vol. III, p. 3, 1946.

*Primary Examiner*—Paul F. Shaver
*Attorney, Agent, or Firm*—Donald L. Johnson; Robert A. Linn; Joseph D. Odenweller

[57] ABSTRACT

Aromatic amines (e.g., aniline) are selectively alkylated in an ortho nuclear position by reaction with an olefin (e.g., ethylene) in the presence of an aluminum anilide catalyst. Hydrogen halides (e.g., HCl) are added to increase the reaction rate.

66 Claims, No Drawings

CHEMICAL PROCESS

This application is a continuation-in-part of application Ser. No. 365,996, filed June 4, 1973, now abandoned.

BACKGROUND

Alkylated aromatic amines are valuable dye intermediates and are used in the manufacture of several selective herbicides. The most desired products are the ortho alkyl anilines. Aromatic amines can be selectively alkylated in an ortho position by reaction with an olefin in the presence of an aluminum anilide catalyst, as described by Kolka et al, U.S. Pat. No. 2,814,646. Stroh et al, U.S. Pat. No. 3,275,690, describe the use of Friedel-Crafts catalysts, alone or in conjunction with aluminum anilide to effect ortho alkylation. Klopfer, U.S. Pat. No. 3,654,331, describes ortho-alkylation of aromatic amines using alkyl aluminum halides. Schmerling, U.S. Pat. No. 3,222,401, describes the random cycloalkylation of aromatic amines in the ortho, meta and para positions using a Friedel-Crafts or hydrogen halide catalyst. Schmerling, U.S. Pat. No. 3,230,257, describes the random nuclear and N-alkylation of hydrogen halide salts of aromatic amines by reaction with olefins.

SUMMARY

According to the present invention, the selective ortho-alkylation of aromatic amines using an aluminum anilide catalyst is promoted (i.e., the reaction rate is increased) by addition of hydrogen halide to the alkylation mixture.

DESCRIPTION OF THE PREFERRED EMBODIMENTS

A preferred embodiment of the invention is an improvement in the process of alkylating aromatic amines selectively in an ortho nuclear position, said aromatic amine having an unsubstituted ortho position and at least one hydrogen atom bonded to said amine nitrogen atom, said process comprising reacting said aromatic amine with an olefin at a temperature of about 200–500°C. in the presence of an aluminum anilide catalyst, said improvement comprising adding hydrogen halide to the alkylation mixture in an amount to provide up to two halogen atoms per aluminum atom thereby increasing the rate of alkylation.

The improved process is applicable to a broad range of aromatic amines. The only requirement is that the aromatic amine have at least one unsubstituted nuclear ortho position and at least one hydrogen atom bonded to the amine nitrogen atom. Such compounds are well known in the prior art. These include all the aromatic amines that can be alkylated by the basic process disclosed in U.S. Pat. No. 2,814,646, incorporated herein by reference. They can be mono- or poly-nuclear and also mono- or poly-amino, as, for example, amino benzenes, amino naphthalenes, amino anthracenes, amino phenanthrenes, amino chrysenes, amino pyrenes, and the like. The aromatic amine can also have other nuclear substituents, such as alkyl, aryl, alkaryl, aralkyl, cycloalkyl, substituted-cycloalkyl, halogen, alkoxy, aryloxy, and the like. Likewise, the nuclear substituents may form a closed ring such as in the case of indene. Of the various aromatic amines, the preferred are the mono-, di- or tri-nuclear amines and particularly the amino benzenes.

Examples of suitable amines include:

m-toluidine
o-toluidine
4-isobutylaniline
4-sec-eicosylaniline
N-methylaniline
2-tert-butylaniline
4-phenylaniline
4-α-methylbenzylaniline
4,4'-methylenebisaniline
4,4'-isopropylidenebisaniline
p-phenylenediamine
N,N'-dimethyl-p-phenylenediamine
6-sec-eicosyl-α-naphthylamine
α-naphthylamine
β-naphthylamine
N-methyl-α-naphthylamine
α-aminoanthracene
3-aminophenanthrene
7-aminoindene
1-aminochrysene
2-aminopyrene
4-cyclohexylaniline
4-phenylaniline
p-toluidine
2,4-dimethylaniline
2,5-dimethylaniline
o-ethylaniline
m-ethylaniline
p-ethylaniline
2,4-diethylaniline
2,5-dimethylaniline
1-methyl-2-naphthylamine
3-methyl-2-naphthylamine
o-phenylenediamine
m-phenylenediamine
p-phenylenediamine
4-methyl-o-phenylenediamine
4-methyl-m-phenylenediamine
4-ethyl-o-phenylenediamine
2-methyl-p-phenylenediamine
2-ethyl-p-phenylenediamine The most preferred amines are the primary and secondary amino benzenes, referred to collectively as anilines. Examples of these are aniline, N-methylaniline, N-ethylaniline, p-sec-docosylaniline, p-methoxyaniline, p-bromoaniline, N-butyl-m-bromoaniline, and the like. Of these, the highly preferred are aniline and alkyl-substituted anilines, for example, $C_{1-20}$ alkyl anilines. The most preferred starting materials are aniline and o-toluidine.

The olefins used in the process include olefins which are both mono- or poly-unsaturated, cyclic or acyclic, substituted or unsubstituted, and both terminal and internal olefins. Examples of acyclic monoolefins are ethylene, propylene, butene-1, butene-2, isobutene, pentene-1, isopentene, pentene-2, hexene-1, hexene-2, 2-methyl pentene-1, 2-methyl pentene-2, n-decene-1, 2-ethyl octene-1, 2-ethyl octene-2, n-decene-2, dodecene-1, 2-ethyl decene-1, 2-ethyl decene-2, dodecene-2, octadecene-1, octadecene-2, 2-methyl heptadecene-1, diisobutylene, eicosene-1, eicosene-2, 2-ethyl octadecene-1, docosene-1, docosene-2, triacontene-1, 2-ethyl octacosene-1, tetracontene-2, pentacontene-1, and the like.

Examples of cyclic monoolefins are cyclopentene, cyclohexene, cyclooctene, 1-methylcyclohexene, 1-butylcyclohexene, 1-methylcyclooctene, and the like.

Useful acyclic polyenes include 1,3-butadiene, 2-methyl-1,3-butadiene, 2,3-dimethyl-1,3-butadiene, 1,4-pentadiene, and the like. Some useful cyclic polyenes are cyclopentadiene, dicyclopentadiene, 1,3-cyclooctadiene, 1,3-cyclopentadiene, 1,4-octadiene, 1,3,5-cyclooctatriene, and the like.

The substituted olefins can have any substituents that do not interfere with the reaction. Examples of such substituents are halogens, alkoxy groups, aryloxy groups, aryl radicals, and the like. Illustrative examples of such olefins are 2-chloro-1,3-butadiene, vinyl chloride, allyl chloride, vinyl bromide, ethyl vinyl ether, phenyl vinyl ether, butyl vinyl ether, lauryl acrylate, methyl acrylate, indene, α-methyl styrene, 4-dodecyl styrene, 4-sec-octyl-α-methyl styrene, and the like.

In general, highly preferred olefin reactants are the acyclic aliphatic monoolefins containing from 2–12 carbon atoms, cyclic olefins containing from 5–10 carbon atoms, and arylsubstituted monoolefins containing from 8–20 carbon atoms. Most preferred are ethylene and propylene.

The amount of olefin added to the aromatic amine will vary depending upon whether mono- or di-alkylation is desired. The precise amount is not a critical feature of the process. In general, from about 0.5 mole equivalent to 8 mole equivalents of olefin are added for each mole of aromatic amine. A most useful range is from about one mole equivalent to 3 mole equivalents of olefin for each mole equivalent of aromatic amine.

The aluminum anilide catalysts include compounds having an aluminum atom bonded through an amino nitrogen atom to a benzene ring of an aromatic group, which are referred to collectively herein as aluminum anilides. The aromatic portion of the molecule generally corresponds in structure with the aromatic amine being alkylated, although this is not required. The catalyst can be made by reaction of an aluminum anilide forming composition with the aromatic amine. Examples of aluminum anilide forming compositions are aluminum metal and alkyl aluminums such as trimethyl aluminum, tri-ethyl aluminum, triisobutyl aluminum, and the like. Aluminum anilide preparation with aluminum metal is generally accomplished by adding granulated aluminum or aluminum ribbon to the aromatic amine and heating to about 100°–300°C. Alternatively, the catalyst can be prepared by reacting an alkyl aluminum such as triethyl aluminum with the aromatic amine.

The amount of aluminum anilide catalyst can vary widely. It is expressed in terms of molecular ratio of aromatic amine to aluminum. In general, good results are obtained using 7.5–30 moles of aromatic amine per mole of aluminum, and more preferably 10–20:1, and especially about 15:1.

In a highly preferred embodiment the aluminum anilide is obtained by adding to the aromatic amine the distillation bottoms remaining after distilling alkyl aluminum product from a reaction mixture formed by reacting a $C_{2-5}$ alpha-olefin and hydrogen with aluminum metal according to the well-known Ziegler aluminum alkyl process. The reaction is conducted in the presence of aluminum alkyl which initially forms alkyl aluminum hydride which adds olefin (H. Zeiss, "Organometallic Chemistry," A.C.S. Monograph Series, pp. 194–196, Reinhold Publishing Corp., N.Y., 1960, and references cited therein, incorporated herein by reference). Various ramifications of the Ziegler aluminum alkyl process are described in U.S. Pat. Nos. 2,787,626; 2,826,598; 2,886,581; 2,885,314; 3,100,786; 3,207,770; 3,207,772; 3,207,773 and 3,207,774, which are also incorporated herein by reference.

Olefins which are used to prepare the alkyl aluminum according to the Ziegler process are the alpha or terminal olefins such as ethylene, propylene, n-butene, isobutene, α-pentene, 2-methyl-1-butene, and the like. Generally the olefin is a $C_{2-5}$ alpha-olefin.

The alkyl aluminum process is carried out under hydrogen pressure. Finely-divided aluminum metal is wetted with trialkyl aluminum under an inert atmosphere and the mixture pressurized with hydrogen followed by alpha-olefin or a mixture of hydrogen and alpha-olefin to about 10–300 atmospheres. The mixture is reacted at about 25°–150°C., preferably 30°–130°C. for a period sufficient to form a substantial quantity of alkyl aluminum product.

Alkyl aluminum product is recovered from the reaction mixture by distillation. The distillation is conducted until the product being distilled begins to contain an unacceptable amount of impurity. This leaves a distillation residue or bottoms that contains a crude mixture of organoaluminum compounds. Frequently these bottoms or "heel" are used as the activator for subsequent alkyl aluminum preparations carried out by adding fresh aluminum metal to the heel and then again pressurizing with hydrogen and alpha-olefin as before. As this procedure is followed, the amount of distillation bottoms continues to increase and eventually a portion of it must be removed. This bottoms portion has in the past represented a waste and, in fact, presents a difficult disposal problem.

The preferred hydrogen halides are hydrogen bromide and hydrogen chloride. Because of its low cost and excellent results, the most preferred hydrogen halide is hydrogen chloride.

The hydrogen halide promoter can be added directly to the distillation bottoms to provide an optimum halogen/aluminum atom ratio up to about 2/1, e.g., 0.1/1 to 2/1. Alternatively, both the distillation bottoms and the hydrogen halide can be added directly to the aromatic amine in amounts to provide optimum alkylation conditions.

In another preferred embodiment the aluminum anilide is obtained by adding to the aromatic amine the distillation residue remaining after distilling an alkyl aluminum sesquihalide (e.g., alkyl aluminum sesquichlorides) from a reaction mixture formed by reacting a lower alkyl halide (e.g., $C_{1-4}$ alkyl chlorides) with aluminum metal. The reaction of alkyl halides with aluminum metal forms alkyl aluminum sesquihalides (A. Von Grosse et al, J. Org. Chem. 5, pp. 106–121, 1940; G. E. Coates, "Organo-Metallic Compounds," pp. 140–142, John Wiley and Sons, Inc., N.Y., 1960, incorporated herein by reference). These distillation residues contain aluminum in various forms and also contain halide. Generally, there is insufficient halide to provide the optimum alkylation conditions, so, according to this embodiment, additional halide is provided by adding hydrogen chloride or hydrogen bromide to provide up to about two atoms of halogen per aluminum atom. The hydrogen halide can be added directly to the distillation residue and the resultant mixture added to the aromatic amine, or both the distillation residue and the hydrogen halide can be added directly to the aromatic amine in proportions to obtain the optimum halide/aluminum ratio.

The aromatic amine alkylation process proceeds best at elevated temperatures. A useful range is from about 200°–500°C. A preferred temperature range is from about 250°–400°C., and best results are usually obtained at about 300°–350°C.

The pressure under which the reaction is conducted is not an independent variable, and varies with the temperature and vapor pressure of the reactants. With the more volatile lower olefins such as ethylene, the reaction pressure will be quite high, while with the higher olefins only moderate pressures will be observed. Depending upon the reactants and the temperature, the pressure will range from about atmospheric to 2500 psig.

The process should be conducted under a substantially inert atmosphere. Excessive amounts of oxygen or moisture will stop the alkylation. This is not to say that the reactants need be absolutely anhydrous, but only that they should be substantially anhydrous. Also, the amount of oxygen in the reaction vessel should be minimized, generally by flushing the reaction vessel with an inert gas such as nitrogen, methane, ethane or propane, prior to conducting the reaction.

The reaction can be conducted in the presence of an inert solvent. Suitable solvents include aromatic and aliphatic hydrocarbons. Examples of useful aromatic hydrocarbons are toluene, xylene, mesitylene, and the like. Examples of useful aliphatic hydrocarbons are hexane, n-octane, isooctane, decane, and the like.

According to the present invention, the reaction rate of the olefin with the aromatic amine is substantially increased by adding a promoter amount of a hydrogen halide to the alkylation mixture. A promoter amount is an amount sufficient to increase the reaction rate. In general, this can be accomplished by adding an amount of hydrogen halide to the alkylation reaction to provide up to about two atoms of halogen per atom of aluminum. A useful range is about 0.1–2 moles of hydrogen halide per mole of aluminum. A more preferred atom ratio of halogen to aluminum is 1–2:1, and the most preferred ratio is about 1:1. Although any of the hydrogen halides such as hydrogen chloride or hydrogen bromide can be used, it is preferred that the hydrogen halide used be hydrogen chloride because of its low cost, ready availability and high effectiveness.

The hydrogen halide can be added directly to the aromatic amine, or when the catalyst is made by reaction of an aluminum alkyl with the aromatic amine the hydrogen halide can be added to the aluminum alkyl to provide the desired aluminum: halogen atom ratio. The resultant alkyl aluminum-hydrogen halide mixture can then be added to the aromatic amine to form the aluminum anilide catalyst containing the promoter. Alternatively, the aluminum alkyl can be first added to the aromatic amine to form an aluminum anilide catalyst and the hydrogen halide subsequently added to the mixture.

In another preferred embodiment, aluminum metal is added to an aromatic amine and the mixture heated, causing the aluminum to react with the aromatic amine to form an aluminum anilide catalyst and subsequently the hydrogen halide promoter is added to the mixture.

The manner in which the improved process is conducted is shown by the following examples.

EXAMPLE 1

This example illustrates the alkyl aluminum process from which the distillation bottoms are obtained.

About 250 parts of finely-divided aluminum metal is charged to an autoclave, under a dry, inert gaseous atmosphere of nitrogen. The aluminum is prepared by milling or filing in a dry nitrogen atmosphere. To this charge is added sufficient triethylaluminum $(C_2H_5)_3Al$, to thoroughly wet all the particles of aluminum, this amount being about 20 parts. The autoclave is closed, and a pressure of about 5 atmospheres of hydrogen gas and an additional 10 atmospheres of commercially pure ethylene gas is introduced to the autoclave. The contents are slowly stirred by means of an externally driven agitator and the temperature is raised from ambient levels to about 80°–85°C. The contacting is continued for a period of from 5 to 6 hours, during which time the pressure is maintained in the range indicated above. At the conclusion of this period the temperature is then lowered to about 20°–25°C., and excess reactants are let off. The autoclave vapor space is flushed with dry gaseous nitrogen for several cycles to thoroughly remove reactant components and the triethylaluminum is recovered by distillation, leaving a distillation residue.

The above procedure is repeated by adding 250 parts of aluminum metal and using the distillation bottoms to wet the aluminum metal. The amount of distillation bottoms increases with each subsequent run and provides a larger quantity of distillation bottoms for use in preparing the present catalysts.

The above general procedure can be followed to obtain distillation bottoms using other alpha-olefins such as propylene, butene-1, isobutene, 2-methyl-1-butene, and the like.

A solution of the distillation bottoms is prepared for use in subsequent work by diluting 500 grams of the distillation bottoms with 268 grams of neutral mineral oil. The oil-diluted bottoms analyzes 17.3 weight per cent aluminum.

EXAMPLE 2

In a high pressure autoclave was placed 325.5 grams (3.5 moles) of aniline. The autoclave was flushed with nitrogen. To this was added dropwise 36.4 grams of the oil-diluted distillation bottoms prepared in Example 1. After the addition the autoclave was sealed and heated to 200°C. over a 45 minute period. Pressure rose to 230 psig. It was then cooled to room temperature and vented. Dry HCl was pressurized into the sealed autoclave to give a Cl/Al atom ratio of 2.27, which is higher than desired. While stirring, it was heated to 185°C. The autoclave was vented and again sealed. Then 51 grams of ethylene were pumped in and the autoclave heated to 315°C. (975 psig). Ethylene feed was again started at a rate adequate to hold about 1000 psig at 315°C. A total of 157 grams of ethylene was added over 5 hours. The autoclave was cooled, vented and the contents (412.5 grams) discharged. The product contains 25.1 per cent 2,6-diethyl aniline, 24.3 per cent o-ethyl aniline, and 8.8 per cent aniline, and are recovered by caustic hydrolysis followed by vacuum distillation.

EXAMPLE 3

This example was carried out similar to Example 2 except HCl was added to the triethyl aluminum distillation bottoms prior to adding these to the aniline.

The autoclave was charged with 325.5 grams of aniline and flushed with nitrogen. In a separate container, dry HCl was injected into 36.4 grams of the mineral oil-diluted triethyl aluminum bottoms described in Example 1 to give a Cl/Al ratio of 0.53. The mixture became thick and it was necessary to dilute it with 10 ml of hexane. This was added to the aniline in the autoclave and the autoclave was sealed. It was heated to 202°C. (180 psig). It was then cooled to 50°C. and vented. It was again sealed and heated to 180°C. and ethylene addition started. Heating was continued up to 315°C. and a total of 231 grams of ethylene was added at 1000 psig over 71 minutes. The autoclave was cooled and discharged. Analysis showed the product to contain 82.6 per cent 2,6-diethyl aniline, 0.8 per cent o-ethyl aniline, and no aniline, which are readily recoverable by caustic hydrolysis followed by vacuum distillation.

EXAMPLE 4

This example is the same as Example 2 except ethylene was added prior to heat-up.

To an autoclave was added 325.5 grams of aniline and the autoclave was then flushed with nitrogen. Then 36.4 grams of the mineral oil-diluted triethyl aluminum distillation bottoms described in Example 1 were added. The autoclave was sealed and heated to 200°C. (225 psig) and then cooled. At 60°C., it was vented and dry HCl added to give a Cl/Al atom ratio of 0.685 while cooling was continued to 24°C. The autoclave was pressurized with ethylene to 285 psig and the mixture heated to 315°C. (600 psig) and ethylene feed resumed to hold 1000 psig at 315°C. After 74 minutes a total of 230 grams of ethylene had been added and the mixture was cooled, vented and discharged (428 grams). The product analyzed 82.6 per cent 2,6-diethyl aniline, 2.8 per cent o-ethyl aniline, and a trace of aniline, which are readily recoverable by caustic hydrolysis followed by vacuum distillation.

EXAMPLE 5

In this example triethyl aluminum was used to form the catalyst instead of distillation bottoms.

In an autoclave was placed 325.5 grams of aniline and the autoclave flushed with nitrogen. While stirring, 26.6 grams of triethyl aluminum were added dropwise, following which the autoclave was sealed and heated to 200°C. (295 psig). The autoclave was cooled to 26°C. and vented. Dry HCl was added at 26°–32°C. to give a Cl/Al ratio of 1.11. The autoclave was sealed and pressurized to 615 psig with ethylene and then heated up to 315°C. (740 psig). Ethylene feed was resumed to hold about 1000 psig at 315°C. After 56 minutes a total of 219 grams of ethylene had been added and the autoclave was cooled, vented and discharged (409 grams). The product analyzed 88.8 per cent 2,6-diethyl aniline, 0.3 per cent o-ethyl aniline and no aniline, which are readily recoverable by caustic hydrolysis and distillation.

EXAMPLE 6

This example illustrates the process when the catalyst is made from aluminum metal and the hydrogen halide added subsequently.

To an autoclave add 325.5 grams of aniline and 6.3 grams of granular aluminum metal. Flush with nitrogen and seal. Heat to about 250°C. to form aluminum anilide and cool to 30°C. Vent and add 8.5 grams of dry HCl. Stir for 30 minutes and then pressurize to 600 psig with ethylene and heat to 315°C. Add ethylene to hold autoclave at 1000 psig. When ethylene uptake stops, cool and vent and discharge. Recover 2,6-diethyl aniline by caustic hydrolysis and distillation.

Aniline and ethylene have been used in the above examples. It is readily apparent that the same procedure can be carried out using any of the other aromatic amines disclosed and also any of the many olefins. Likewise, good results are expected when other hydrogen halides are substituted for HCl, such as HBr.

EXAMPLE 7

This example illustrates the process carried out using distillation residue from an ethyl aluminum sesquichloride (EASC) process. The EASC process is conducted by adding granular aluminum metal to an autoclave and sufficient EASC to wet the aluminum metal. Then, ethyl chloride is pumped into the autoclave and the mixture reacted at about 110°–120°C. at about 400 psig until no further ethyl chloride absorption occurs. The autoclave is then vented, neutral oil added as a distillation chaser, and the EASC product recovered by distillation. The distillation residue contains 7.6 weight per cent aluminum metal, 9.2 weight per cent organoaluminum compounds, 15.2 weight per cent chloride, 43 weight per cent neutral oil plus other miscellaneous components. The chloride/aluminum atom ratio is 0.689/1. To 161 pounds of this residue in a closed stirred vessel is added 29.5 pounds of dry HCl. While stirring, the mixture is heated to 200°C. and then cooled to 50°C. and the vessel vented. The residue now has a chloride/aluminum atom ratio of 1.5/1.

In an autoclave place 1395 pounds of aniline and flush the vessel with nitrogen. Add the 190.5 pounds of distillation residue-HCl mixture and seal the autoclave. Pressurize the autoclave to 500 psig with propylene and heat to 300°C. while stirring. Resume propylene feed to maintain a pressure of 1000 psig. When propylene uptake stops (appx. 9 hours) cool and vent. Discharge and wash the product with aqueous caustic to remove aluminum and then distill under vacuum to recover, as the main product, 2,6-diisopropyl aniline.

In the most preferred embodiments described above the catalyst was derived from distillation bottoms obtained by distilling trialkyl aluminum product from a reaction mixture formed by reacting alpha-olefin, hydrogen and aluminum metal according to well-known Ziegler reaction conditions. Although not as effective as the hydrogen halide promoted process, the distillation bottoms themselves can be used to catalyze the alkylation of aromatic amines with olefins and this represents a further embodiment of the invention.

In this embodiment the distillation bottoms are added to the aromatic amine in an amount to provide about one mole of aluminum per 5–30 moles of aromatic amine. The mixture is heated to form the catalyst. A preferred concentration of catalyst is about one mole of aluminum per 7.5–15 moles of aromatic amine. The process is applicable to the same aromatic amines previously described and especially aniline and alkyl anilines. The same olefins can be used and the same pressure and temperature conditions applied. Reaction times to obtain equivalent yields are longer. This embodiment is illustrated by the following example.

EXAMPLE 8

In an autoclave was placed 226 grams of aniline. This was heated to 50°C. and the vessel flushed with nitrogen. To it was added 36.4 grams of the mineral oil diluted TEA distillation bottoms from Example 1 (0.233 m Al). An additional 100 grams of aniline were used to rinse in the bottoms. The autoclave was sealed and heated to 200°C. Then 40 grams of ethylene were pumped in and heating continued to 315°C. Ethylene feed was resumed to maintain 1000 psig. After 155 minutes a total of 232 grams of ethylene had been pumped into the autoclave, and ethylene uptake stopped. The reaction mixture was stirred at 315°C. for 15 additional minutes, at which time it was cooled to 90°C. and discharged. The reaction mixture was washed with aqueous caustic to remove aluminum. The product analyzed by VPC as 67.4 per cent 2,6-diethyl aniline, 23.4 per cent 2-ethyl aniline, 5.2 per cent aniline, 3.4 per cent 2-sec-butyl-6-ethyl aniline, and the remainder high boiling material.

In like manner, the distillation residue remaining after distilling an alkyl aluminum sesquihalide (e.g., alkyl aluminum sesquichloride) from a reaction mixture formed by reacting a lower alkyl halide (e.g., $C_{1-4}$ alkyl chlorides) with aluminum metal can be added to the aromatic amine to form the catalyst. A small amount of alkyl aluminum halide is used as a catalyst. Optionally, a portion of the distillation residue from a previous run can be used as a catalyst. The distillation is conducted until a substantial portion of the alkyl aluminum sesquihalide has been separated, as evidenced by the appearance of impurities in the distillate. This distillation residue is the same residue mentioned earlier to which HCl can be added to optimize the Cl/Al atom ratio. Even without this HCl addition the residue forms an effective catalyst when added to the aromatic amine in an amount to provide an aluminum-/aromatic amine mole ratio of about 1/5–30, and more preferably 1/10–20. The following example illustrates this embodiment.

EXAMPLE 9

To an autoclave add 1395 pounds of aniline. Flush with nitrogen and add 161 pounds of the EASC distillation residue described in Example 7 but without the HCl chloride adjustment. Heat to 150°C. and then cool and vent. Pressurize to 500 psig with ethylene and heat to 315°C. Resume ethylene feed to maintain about 1000 psig. After ethylene uptake stops, cool and vent. Wash the product with aqueous caustic to remove aluminum an vacuum distill to recover, as the principal product, 2,6-diethyl aniline.

As mentioned previously, both the aluminum anilide forming composition (e.g., aluminum metal, alkyl aluminums such as triethyl aluminum, alkyl aluminum distillation bottoms, and the like) and the hydrogen halide can be added directly to the aromatic amine in the proper ratio to form the active catalyst. Examples 2 and 4–6 illustrate the sequence in which the aluminum anilide forming composition is first added to the aromatic amine, following which the hydrogen halide is added to provide up to about two atoms of halogen per atom of aluminum. The following example illustrates the process in which the hydrogen halide is first added to the aromatic amine, following which the aluminum anilide forming composition is added.

EXAMPLE 10

In an autoclave was placed 250 grams of aniline. The autoclave was sealed and 8.5 grams of dry HCl was injected into the aniline. The autoclave was then flushed with nitrogen and 36.4 grams of triethyl aluminum distillation bottoms (containing 0.233 moles of aluminum) was added. This was rinsed in using 76 grams of aniline to give an Al:Cl atom ratio of 1:1. The autoclave was sealed and heated to 200°C. and held at that temperature for 25 minutes. It was then cooled, vented and then pressurized to 350 psig with ethylene. It was heated to 315°C. and ethylene added to raise the pressure to 1000 psig. Alkylation was continued for 1.5 hours at 315°C. while adding ethylene to hold 1000 psig. A total of 220 grams of ethylene was used. The autoclave was then cooled and the reaction mixture discharged and hydrolyzed with 300 grams of 13.5 per cent aqueous caustic. The caustic layer was drained and the product filtered and dried under vacuum to give 408 grams of product which analyzed by VPC to contain principally 84.2 weight per cent 2,6-diethyl aniline, 2.9 weight per cent 2-ethyl aniline and 2.9 weight per cent unreacted aniline.

The above general procedure can be followed substituting other forms of aluminum anilide forming compositions for the triethyl aluminum distillation bottoms used in the example. For example, good results are obtained by substituting equal molar amounts of triethyl aluminum, triisobutyl aluminum, triisobutyl aluminum distillation bottoms, methyl aluminum sesquichoride distillation bottoms, ethyl aluminum sesquichloride distillation bottoms, aluminum metal, and the like. Similarly, hydrogen bromide can be used in place of hydrogen chloride. Also, the amount of hydrogen halide can be varied to provide up to about two atoms of halogen per atom of aluminum. As previously disclosed, the amount of aluminum can be varied to provide an aniline: aluminum atom ratio of from about 7.5:1 to 30:1. In like manner, any of the other aromatic amines previously disclosed such as o-toluidine, 4-phenyl aniline, α-naphthylamine, 3-amino phenanthrene, 1-amino chrysene, 4-isobutyl aniline, N-methyl aniline, 1-methyl-2-naphthylamine, 4-methyl-o-phenylenediamine, diphenylamine, p-methoxy aniline, 2-bromo aniline, 4-chloro aniline, and the like, can be used in place of aniline. Good results are also achieved by substituting other olefins in place of the ethylene such as propylene, butene, isobutene, and the like.

As mentioned earlier, the products made available by the present invention are useful in many applications, particularly as intermediates in the preparation of dyes, pharmaceuticals, light-sensitive diazonium salts which are used for diazo printing papers, and inhibitors which will retard the oxidative deterioration of various organic materials such as motor fuel, particularly unsaturated gasolines as, for example, cracked gasoline and polymer gasolines, diesel oil, mineral, oil, lubricating oil, fuel oil, drying oil, greases, rubber monomers such as styrene, butadiene, etc., and the like. Orthoethylaniline made available by this invention may be readily converted to indole following the process of U.S. Pat. No. 2,886,573. Other products such as 2,6- diethyl aniline may be used to prepare plant growth regulators such as those described in U.S. Pat. No. 3,403,994.

We claim:

1. In a process for alkylating an aromatic amine selectively in an ortho nuclear position, said aromatic amine having an unsubstituted ortho nuclear position and at least one hydrogen atom bonded to said amine nitrogen atom, said process comprising reacting said aromatic amine with an olefin at a temperature of about 200°–500°C. in the presence of an aluminum anilide catalyst, the improvement comprising adding a hydrogen halide selected from the group consisting of hydrogen chloride and hydrogen bromide to the alkylation mixture in an amount to provide up to two halogen atoms per aluminum atom in said mixture thereby increasing the rate of alkylation.

2. A process of claim 1 wherein said aromatic amine is aniline and said hydrogen halide is hydrogen chloride.

3. A process of claim 2 wherein said olefin is ethylene.

4. A process of claim 2 wherein said olefin is propylene.

5. A process of claim 1 wherein said aluminum anilide catalyst is formed by adding an alkyl aluminum to said aromatic amine and said hydrogen halide is hydrogen chloride.

6. A process of claim 5 wherein said alkyl aluminum is a trialkyl aluminum.

7. A process of claim 6 wherein said trialkyl aluminum is triethyl aluminum.

8. A process of claim 6 wherein said hydrogen chloride is added to said trialkyl aluminum and the resultant trialkyl aluminum-hydrogen chloride mixture is added to said aromatic amine.

9. A process of claim 8 wherein said trialkyl aluminum is triethyl aluminum.

10. A process of claim 9 wherein said aromatic amine is aniline.

11. A process of claim 10 wherein said olefin is ethylene.

12. A process of claim 10 wherein said olefin is propylene.

13. A process of claim 6 wherein said trialkyl aluminum is added to said aromatic amine and said hydrogen chloride is added to said aromatic amine.

14. A process of claim 13 wherein said trialkyl aluminum is triethyl aluminum.

15. A process of claim 14 wherein said aromatic amine is aniline.

16. A process of claim 15 wherein said olefin is ethylene.

17. A process of claim 15 wherein said olefin is propylene.

18. A process of claim 5 wherein said alkyl aluminum is the distillation bottoms remaining after distilling alkyl aluminum product from a reaction mixture formed by reacting a $C_{2-5}$ alpha-olefin and hydrogen with aluminum metal.

19. A process of claim 18 wherein said alkyl aluminum product is triethyl aluminum and said alpha-olefin is ethylene.

20. A process of claim 19 wherein said hydrogen chloride is added to said distillation bottoms and the resultant distillation bottoms-hydrogen chloride mixture is added to said aromatic amine.

21. A process of claim 20 wherein said aromatic amine is aniline.

22. A process of claim 21 wherein said olefin is ethylene.

23. A process of claim 19 wherein said distillation bottoms are added to said aromatic amine and said hydrogen chloride is added to said aromatic amine.

24. A process of claim 23 wherein said aromatic amine is aniline.

25. A process of claim 24 wherein said olefin is ethylene.

26. A process of claim 18 wherein said alkyl aluminum product is triisobutyl aluminum and said alpha-olefin is isobutene.

27. A process of claim 26 wherein said aromatic amine is aniline.

28. A process of claim 27 wherein said olefin is ethylene.

29. A process of claim 1 wherein said aluminum anilide catalyst is formed by reacting aluminum metal with said aromatic amine and hydrogen chloride is thereafter added to said aromatic amine to provide up to 2 chlorine atoms per aluminum atom.

30. A process of claim 29 wherein said aromatic amine is aniline.

31. A process of claim 30 wherein said olefin is ethylene.

32. A process of claim 30 wherein said olefin is propylene.

33. A process of claim 5 wherein said alkyl aluminum is the distillation residue remaining after distilling alkyl aluminum sesquichloride product from a reaction mixture formed by reacting a lower alkyl chloride with aluminum metal.

34. A process of claim 33 wherein said alkyl chloride is ethyl chloride and said alkyl aluminum sesquichloride is ethyl aluminum sesquichloride.

35. A process of claim 34 wherein said hydrogen chloride is added to said distillation residue and the resultant distillation residue-hydrogen chloride mixture is added to said aromatic amine.

36. A process of claim 35 wherein said aromatic amine is aniline.

37. A process of claim 36 wherein said olefin is ethylene.

38. A process of claim 36 wherein said olefin is propylene.

39. A process of claim 34 wherein said distillation residue is added to said aromatic amine and said hydrogen chloride is added to said aromatic amine.

40. A process of claim 39 wherein said aromatic amine is aniline.

41. A process of claim 40 wherein said olefin is ethylene.

42. A process of claim 40 wherein said olefin is propylene.

43. A process of claim 1 wherein said hydrogen halide is first added to said aromatic amine and thereafter an aluminum anilide forming composition is added to said aromatic amine.

44. A process of claim 43 wherein said hydrogen halide is hydrogen chloride.

45. A process of claim 44 wherein said aromatic amine is aniline.

46. A process of claim 45 wherein said aluminum anilide forming composition is aluminum metal.

47. A process of claim 46 wherein said olefin is ethylene.

48. A process of claim 46 wherein said olefin is propylene.

49. A process of claim 45 wherein said aluminum anilide forming composition is an alkyl aluminum.

50. A process of claim 49 wherein said alkyl aluminum is triethyl aluminum.

51. A process of claim 50 wherein said olefin is ethylene.

52. A process of claim 50 wherein said olefin is propylene.

53. A process of claim 45 wherein said aluminum anilide forming composition is the distillation bottoms remaining after distilling trialkyl aluminum product from a reaction mixture formed by reacting a $C_{2-5}$ alpha-olefin and hydrogen with aluminum metal.

54. A process of claim 53 wherein said trialkyl aluminum product is triethyl aluminum and said $C_{2-5}$ alpha-olefin is ethylene.

55. A process of claim 54 wherein said olefin is ethylene.

56. A process of claim 54 wherein said olefin is propylene.

57. A process of claim 1 wherein said aromatic amine is o-toluidine.

58. A process of claim 57 wherein said hydrogen halide is hydrogen chloride.

59. A process of claim 58 wherein said olefin is ethylene.

60. A process of claim 59 wherein said aluminum anilide catalyst is formed by adding an alkyl aluminum to said o-toluidine.

61. A process of claim 60 wherein said alkyl aluminum is triethyl aluminum.

62. A process of claim 59 wherein said aluminum anilide catalyst is formed by adding the distillation bottoms remaining after distilling alkyl aluminum product from a reaction mixture formed by reacting a $C_{2-5}$ alpha-olefin and hydrogen with aluminum metal, the amount of said distillation bottoms added being adequate to supply about one mole of aluminum per each 5–30 moles of said o-toluidine.

63. A process of claim 62 wherein said alkyl aluminum product is triethyl aluminum and said alpha-olefin is ethylene.

64. A process of claim 63 wherein said hydrogen chloride is added to said distillation bottoms and the resultant distillation bottoms-hydrogen chloride mixture is added to said o-toluidine.

65. A process of claim 63 wherein said distillation bottoms are first added to said o-toluidine and then said hydrogen chloride is added to said o-toluidine.

66. A process of claim 63 wherein said hydrogen chloride is first added to said o-toluidine and then said distillation bottoms are added to said o-toluidine.

* * * * *